(12) United States Patent
Yen

(10) Patent No.: US 6,404,575 B1
(45) Date of Patent: Jun. 11, 2002

(54) READ/WRITE PREAMP INTEGRATED HEAD AND PROCESS FOR FABRICATING SAME

(75) Inventor: Edward Tsing-Chien Yen, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/405,820

(22) Filed: Sep. 24, 1999

Related U.S. Application Data

(60) Provisional application No. 60/101,946, filed on Sep. 25, 1998.

(51) Int. Cl.$^7$ .................................................. G11B 5/09
(52) U.S. Cl. ............................. 360/46; 360/67; 360/55; 360/317; 360/244.1; 360/234.4
(58) Field of Search ................................ 360/46, 67, 55, 360/65, 244.1, 234.4, 234.5, 110, 317, 318; 29/603.07; 327/108

(56) References Cited

U.S. PATENT DOCUMENTS

| | | | | |
|---|---|---|---|---|
| 4,809,103 A | * | 2/1989 | Lazzari | 360/234.4 |
| 5,587,857 A | * | 12/1996 | Voldmann et al. | 360/234.4 |
| 5,712,747 A | * | 1/1998 | Voldmann et al. | 360/234.4 |
| 6,118,602 A | * | 9/2000 | de la Soujeole | 360/46 |

* cited by examiner

*Primary Examiner*—Alan T. Faber

(57) ABSTRACT

A read/write driver with a read/write head made of semiconductor material for writing and reading data from data media with a preamplifier forming a part of the read/write head for processing write signals from said read/write driver and driving a magnetic coil for writing, with power connections to the preamplifier thereby powering the coil. Also, a process for making the read/write head of the invention is described.

12 Claims, 6 Drawing Sheets

Invention

Forming The Preamp

READ/WRITE PREAMP INTEGRATED HEAD AND PROCESS FOR FABRICATING SAME

CROSS REFERENCE TO RELATED APPLICATIONS

This application claims priority to Provisional Application Serial No. 60/101,946 filed Sep. 25, 1998.

FIELD

This invention is directed to reading and writing data residing on flat media, and more particularly to read/write heads used for reading and writing data on flat rotating media.

PRIOR ART

Reading and writing data to and from flat rotating media requires a read/write head be configured to "fly" above the media on an actuator arm, deriving a signal that is then electrically processed by a preamplifier (preamp) mounted on or proximal a base of a disc drive supporting the actuator arm. This arrangement is beneficial because it is desired to keep the weight of the head to a minimum to insure flying with no contact to the media; or if there is contact to insure that as little damage occurs as possible.

As data has become steadily denser and more speed is required, tolerances have become ever closer. Since very high tolerances are routinely maintained in the semiconductor industry, the art has begun to rely on that industry for the light weight, close tolerance heads that are needed.

Initially, the presumption was that polycrystalline silicon would be most advantageous, for several reasons. Polycrystalline silicon (poly) is known to etch more readily in many cases, and the resistivity, in this case the tendency to create leakage paths, may more easily be increased to avoid or reduce leakage currents.

Recently the speeds desired for read/write heads has increased to the point that parasitics associated with the connections from the head to the location of the preamp have become a problem, limiting the rise and fall times of signals and creating a limit on performance thereby.

A particular concern is the wiring from the preamplifier (preamp) output to a coil used for writing. While at this time the preamplifier output wiring contributes only 30 percent of the total degradation of the write flux rise time, the contribution is increasing, and the contribution of flex wiring to the degradation of write flux rise time is a potential bottle neck.

The present invention will be seen to provide a solution to this and other problems, such as the cost of the preamp.

SUMMARY

For high density-high data rate writing of data to magnetic data media, the starting material for a read/write head being made from a semiconductor material is selected from monocrystalline semiconductor grade stock, preferably silicon. The semiconductor material is formed from semiconductor on insulator (SOI) for improved isolation prior to head fabrication. Isolation of the read/write head allows the head to function in noisy environments, where electrical noise is introduced to the main structures, such as the flexure, which could act as an antenna for such noise.

SOI may be a high temperature process, but is fully compatible with the lower temperature steps that follow, since the high temperature steps form the base material and the following steps, such as defining the preamp, only modify the completed base material. Examples of semiconductor grade stock are materials such as silicon, various compounds of gallium such as gallium arsenide, germanium, germanium on silicon, and potentially silicon carbide and diamond, though many other semiconductor and semiconductor compounds are known and could be used. Note that silicon carbide and diamond, because of the hardness of these materials, are especially attractive, though not presently considered practical for use.

Recognizing that the material thereby has the capability of having semiconductors formed thereon with a semiconductor process without adding a weight or size penalty, at least a preamp circuit is defined in the material. The preamp, optionally along with other functions such as filtering and signal processing, is located such that no damage will result in the subsequent processing, and isolated by methods commonly known in semiconductor processing as SOI technology, as discussed before. Surface protection can be provided, for example, by depositing an overcoat of protective material over the preamp and the related circuits, which is then planarized to provide for a conventional read/write head build. Multiple preamps can be built around a single head element and connected through a selective via process to save cost. The via process for interconnecting the various conductors can be shared by the preamp and the read/write head if cost justifies it.

The write head inductance seen by the preamp determines the write flux time. This inductance is composed of the inductance from the head yoke, head coil, and flex wire. Currently the flex wire inductance contribution to write flux degradation is about 30 percent of the total. With the demand for high density/high data rate operation, the desirable write flux time is approaching 2 nanoseconds. Therefore, the high current connections from the preamp to the coil are made as short as the present technology allows, and much faster rise and fall times are possible thereby. In fact, the contribution to write flux rise time is substantially eliminated by this invention.

Additionally, if differential outputs are provided by the preamp, the power for writing to a given coil from a given power supply is substantially doubled without requiring additional external connections, and especially external connections requiring high rise and fall time currents. Conventional approaches to solve the problem of write flux rise time may use the flex wire and/or the preamp in suspension. Both methods improve rise time, but have had limited success, since the flex wire inductance is about 0.5 to 0.7 nanohenries per millimeter, and there are physical limits to how close a discrete preamp can be moved to the head.

BRIEF DESCRIPTION OF THE DRAWINGS

FIG. 6-1 is a flow chart providing additional details of some of the repetitive steps involved in the process of FIG. 6.

FIG. 6-2 is a flow chart providing additional details of some of the repetitive steps involved in the subprocess of FIG. 6-1.

DETAILED DESCRIPTION

Figure 1:
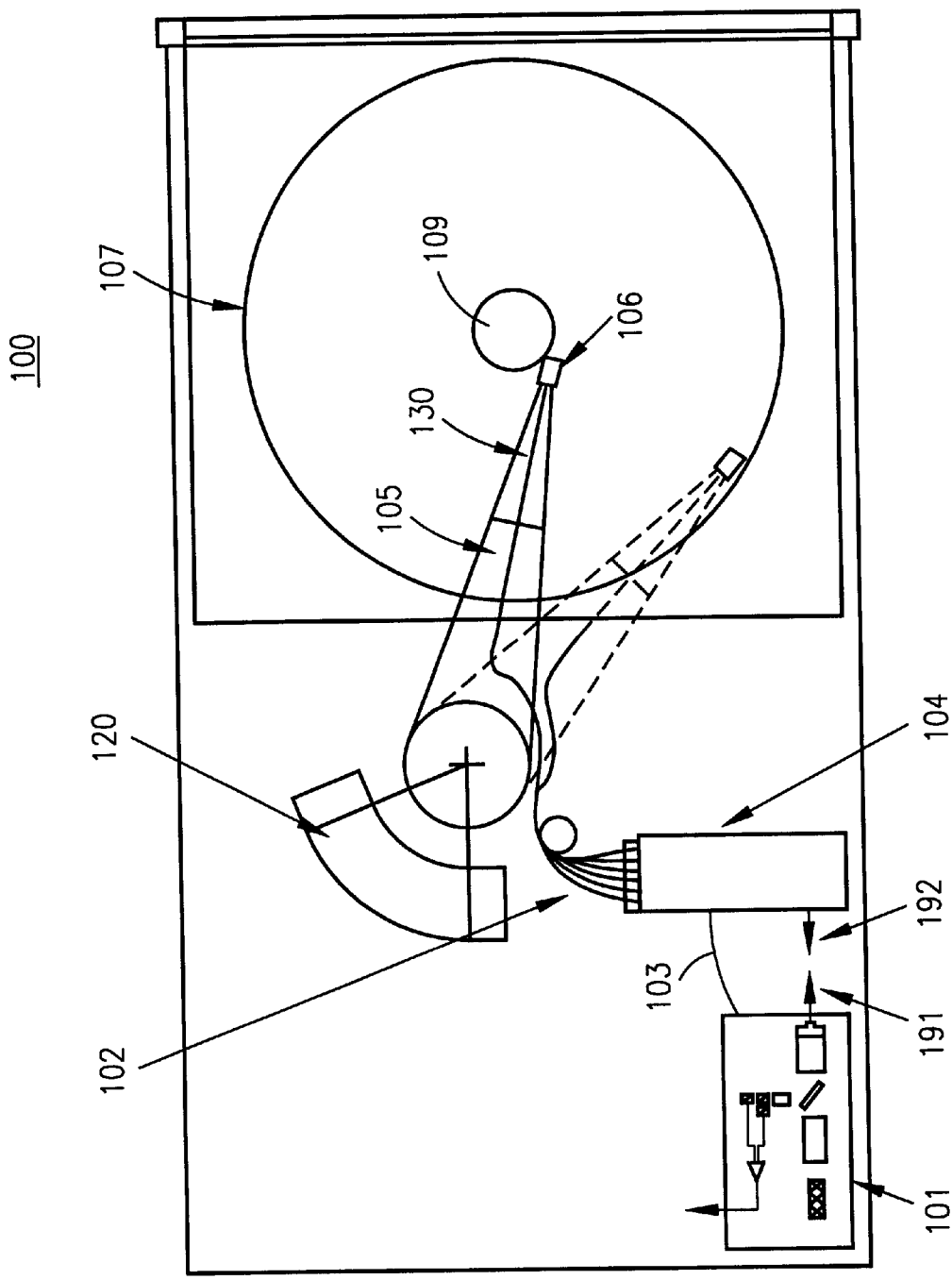
FIG. 1 is an embodiment of a disk drive for writing and reading magnetic data media.

A disk drive 100 of an embodiment of the art which applies to both the prior art and the invention is shown in FIG. 1. Read/write processing board 101 demonstrates both writing and reading circuitry, with the writing circuitry communicating with the head 107 through wire bundle 103 rather than optical links 191 and 192. Optical links 191 and 192 would exist only for magneto-optical reading and writing, but wire bundle 103 exists for both magnetic and magneto-optical reading and writing. Wire bundle 103 is optionally combined with fiber optic bundle 102 from optical switch 104 for communicating with head 106. To write to data media 107, which is mounted on hub 109, wire bundle 103 and optionally optical bundle 102 are disposed down actuator arm 130, which is supported by support 105. Actuator arm 130 and support 105 are powered by actuator driver 120.

In an embodiment of the prior art, an idealized read/write head 200 is shown. A sensor 203 (which, in this embodiment, is a magnetic or a magneto-optical read/write circuit) is connected to two bonding pads 205 and 207, thereby allowing connections such as flex wire to be made from power/sense connections 209 and 211, which both power the sensor and conduct signals from the sensor. The head resides on a slider 106 which is on an actuator 105 of a read/write device for magnetic media 100 as shown in FIG. 1.

In an embodiment of the invention, an idealized read write head 300 of the invention is shown. The power/sense connections of the prior art are now provided by the preamp circuit 303. Power connections are made to the preamplifier (preamp) 303 from power connections 305 and 307, which connect to bonding pads as before. Write signals are provided to the coil 203 by way of an output 315 of preamp 303 in response to write signal connections 311 and 313. The write signal connections 311 and 313 are low current inputs and are connected to the wires 103 of FIG. 1. The output current from an output or outputs 315 of preamp 303 to coil 203 is much larger than the currents in signal connections 311 and 313. The inductive impedance of the wires connecting to wires 207 and 211 of the prior art from the optical processing board 101, with the currents necessary to properly activate coil 203, is proportional to the current through coil 203, so significant signal degradation occurs. Typical inductance for wire of the type normally used, called flex wiring, is 0.5 to 0.7 nH/mm. With the much smaller currents through the same wires 103 from the optical processing board 101 being conducted through wires 311 and 313, signal degradation is greatly reduced. For example, two orders of magnitude reduction in current would result in two orders of magnitude improvement in rise time for that part of the circuit, and the contribution to degradation of the write flux rise time becomes insignificant. Of course, the total inductance in the circuit is determined by other parts of the circuit as well, so less improvement will result than the discussion above indicates, but the improvement is significant for the current reduction a typical preamp will allow. Further, if output 315 is configured as two connections to coil 203, differential write signals may be provided, doubling the power available for writing with a given coil and a given power supply thereby but still not requiring that the currents involved pass though wires 103.

Figure 4:
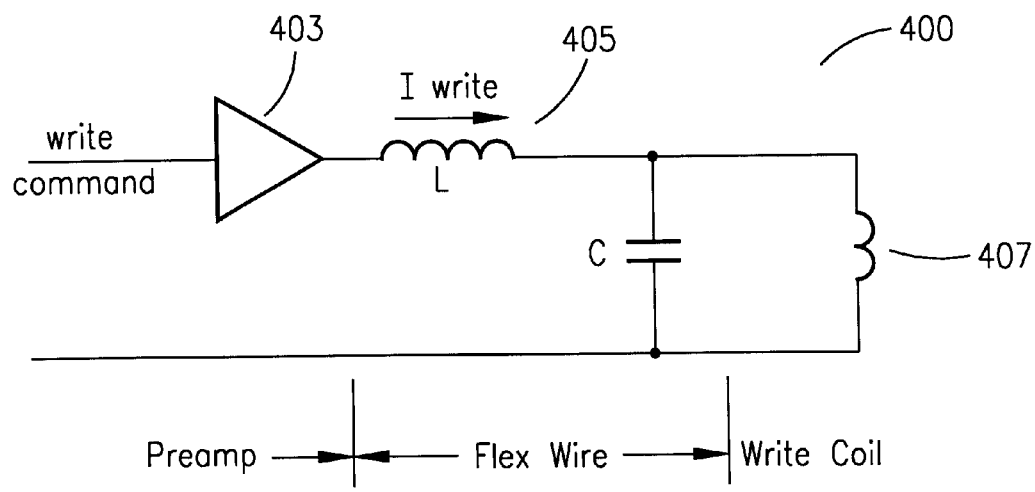
FIG. 4 is a schematic of an embodiment of the prior art, further showing distributed parasitic elements such as inductance and capacitance in wiring as discrete elements.
Figure 5:
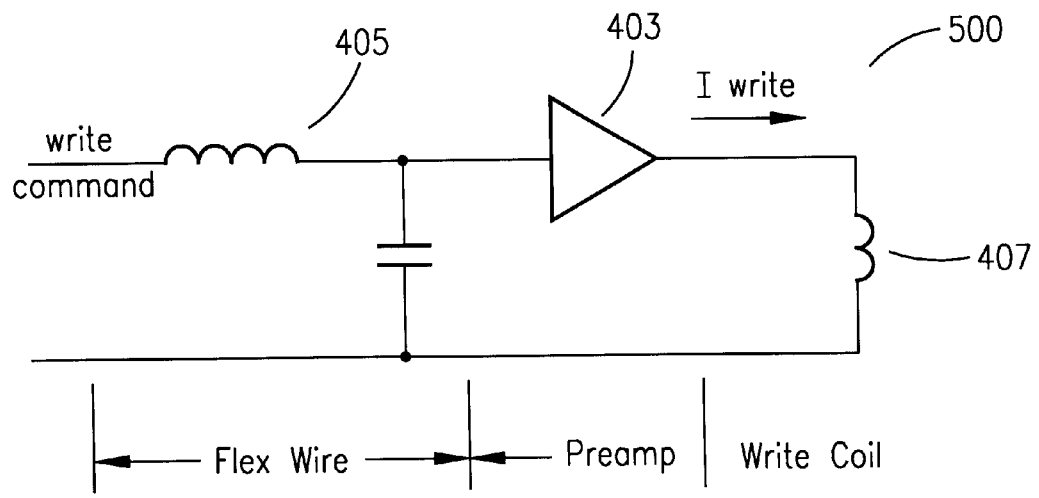
FIG. 5 is a schematic of an embodiment of the invention showing how distributed parasitic elements such as inductance and capacitance are now primarily on the low current input side of the preamp 403.

In an embodiment of a prior art write circuit 400 shown in FIG. 4 for magnetic memory, a preamp 403 drives a relatively large write current $I_{write}$ into flex wire 405; shown here as the equivalent circuit having an inductor L and a capacitor C; thence into a read/write head 407, shown here as a coil. Flex wire 405 acts as a low pass filter, and at the current required by the read/write head represents an appreciable barrier to the write signal, introducing significant delay. When the preamp 403 is moved to the read/write head 407 as shown in an embodiment of the invention 500 in FIG. 5, $I_{write}$ no longer flows in flex wire 405, being replaced by the much smaller input current to the preamp 403, shown here as the write command. Since this current may be several orders of magnitude smaller, the effects of write flux rise in flex wire 405 become insignificant, and write degradation is substantially eliminated.

Figure 6:
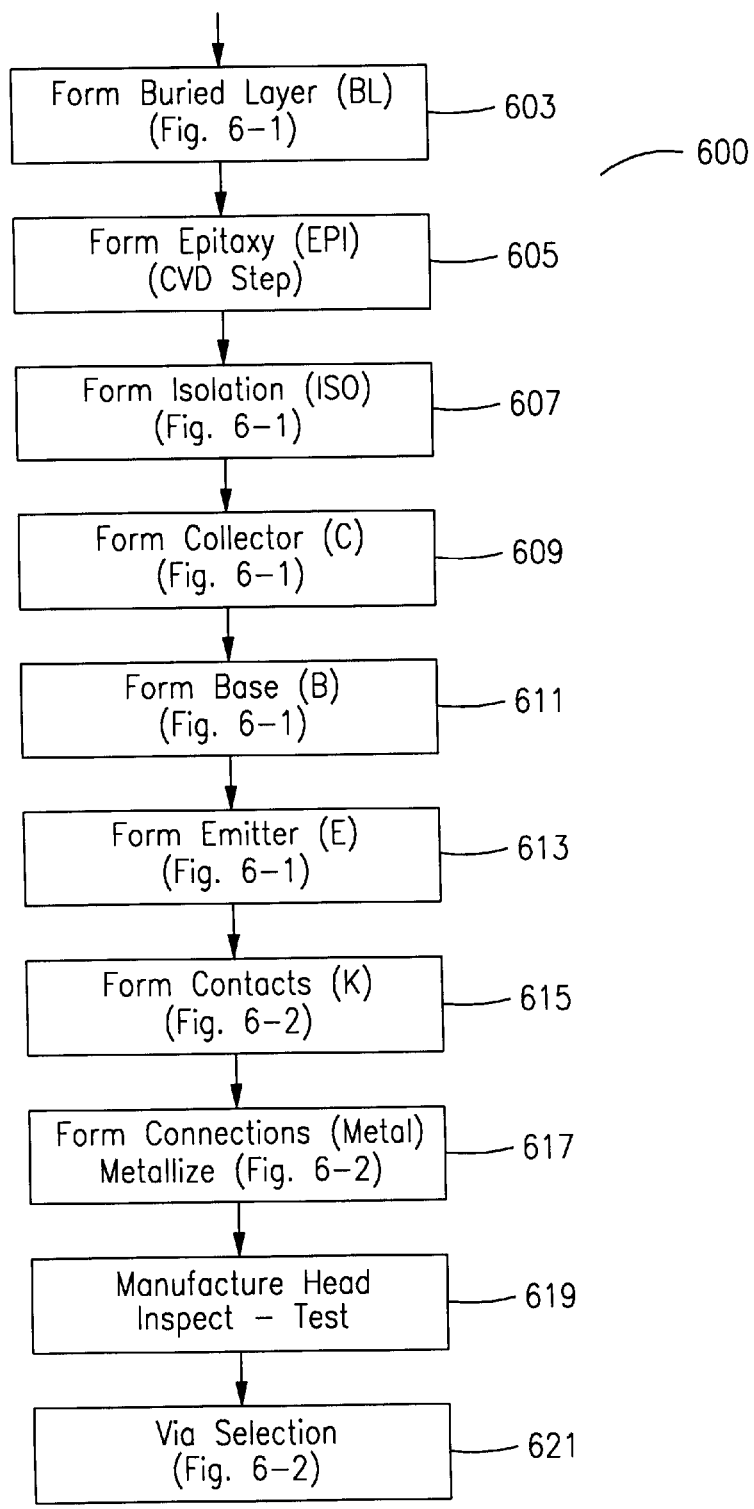
FIG. 6 is a flow chart of the steps required for providing the preamp of this invention, including optional other devices and elements such as filtering.
Figures 1, 6:
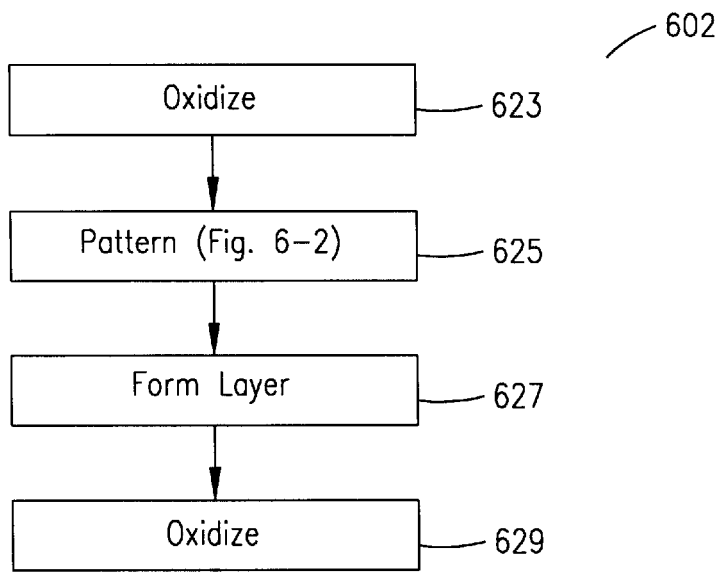
Figures 2, 6:
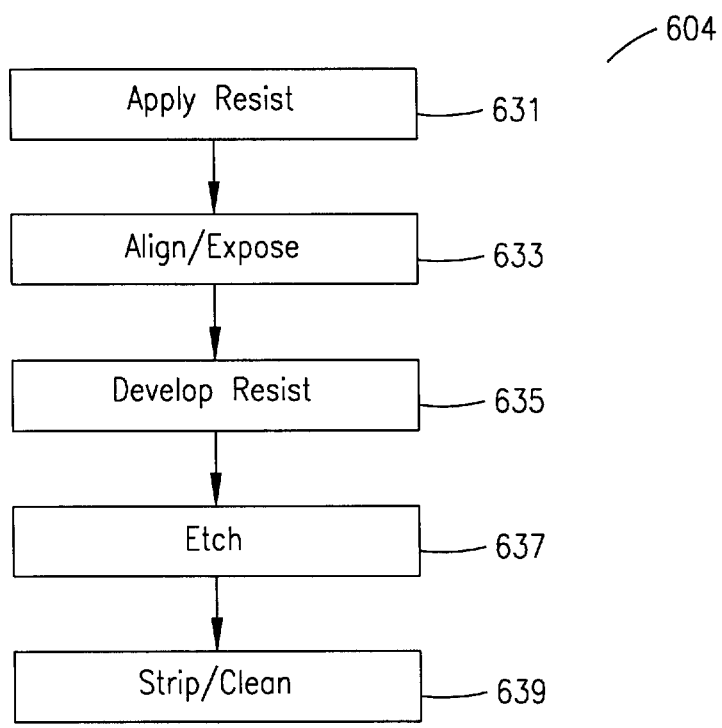

An illustrative flow diagram 600 is shown in FIG. 6 detailing the primary steps required to fabricate the preamp in the invention into a read/write head.

First, on the substrate 641 chosen for fabricating the read/write head, a buried layer (BL) step 603 is formed. As noted, more details relating to this and the following steps are given in FIG. 6-1 and FIG. 6-2. Next, an epitaxial layer (epi) step 605 is formed over the BL step 603. This provides semiconductor grade material above the BL step 603. Then an isolation diffusion (iso) step 607 is optionally formed in the epi step 605. Not all embodiments of the invention will require an iso, and where not needed it will be omitted to reduce cost. A collector (C) step 609 is next formed; C step 609 is substantially connecting BL step 603 through a low resistance so that it will be practical to provide $I_{write}$, which is a relatively large current, as mentioned before.

Now the transistors forming the preamp 403 are begun, base layer step 611 first, in most cases, as shown in FIG. 6 600. An emitter layer, step 613, follows. Then contacts step 615 are formed in the oxide step 623, and in order to connect the transistors into a useful circuit, a metal layer is formed and patterned, step 617. The process then reverts to the steps in FIGS. 6-1 and 6-2 to manufacture the read/write head with the preamp 303 and related circuitry, and to inspect and test the read/write head.

Figure 2:
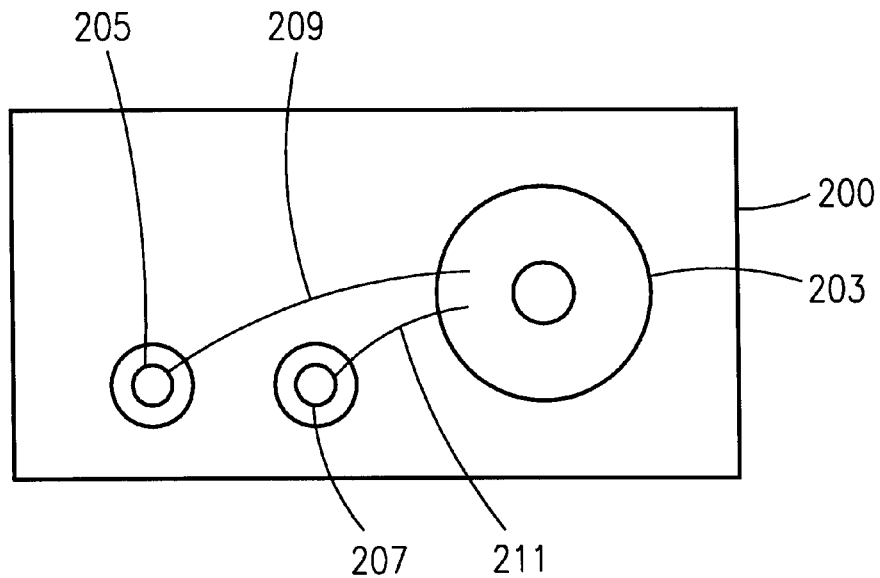
FIG. 2 is an embodiment of a prior art read/write head of the disk drive with connections to a coil forming a part of a head for writing to data media.
Figure 3:
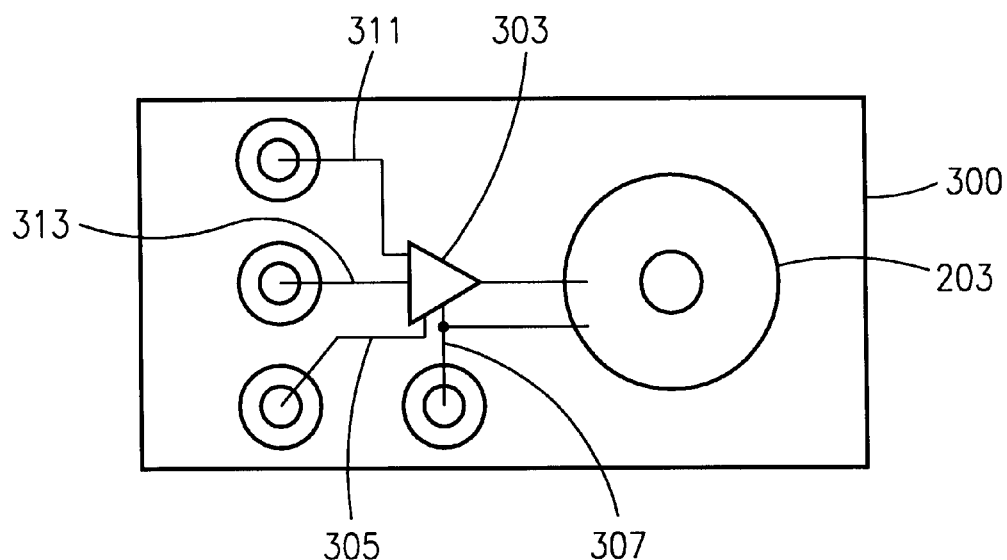
FIG. 3 is an embodiment of the invention with a read/write head formed on semiconductor on insulator (SOI) material having a preamplifier therein.

If additional preamps are provided in the head semiconductor material, one can be selected from the others by selecting the vias, or connection points, for the desired preamp from the group provided, and connecting to those vias. The more detailed steps of forming layers in 6-1 602 give insight into making the elements discussed above. First the area for the preamp is oxidized in step 623, such as by exposure to high temperature steam; normally about 1000 degrees Celsius at one atmosphere. The element is then patterned step 625, with more details on this step in FIG. 6-2; and the element is formed step 627. After cleaning, the element is oxidized in step 623 again to protect the element thus formed from contamination. To provide more detail on the patterning the elements of the device, defining layers in FIG. 6-2 604 shows the patterning steps. First the resist is applied step 631, an align/expose step 633 is followed by a develop resist step 635. Then an etch step 637 defines the pattern in the oxide. The hardened resist is then stripped, and control returns to, for example, FIG. 6 or FIG. 6-1.

Figure 7:
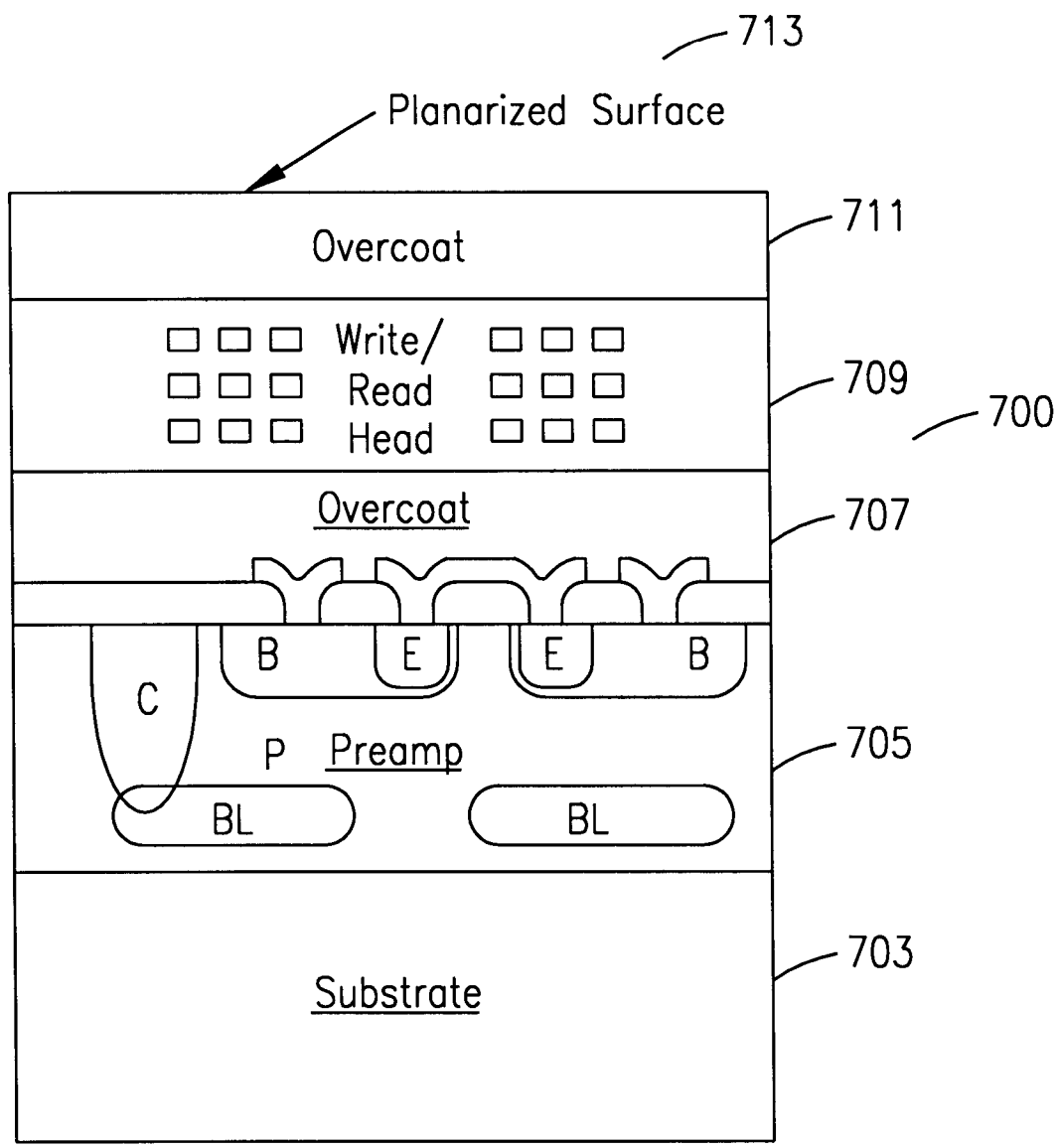
FIG. 7 is an idealized cross section of a preamp of the invention built into a head of the invention.

The result of the above steps of FIGS. 6, 6-1 and 6-2 are shown in FIG. 7 700. In a limited view of the read/write head 700 there is a substrate 703, such as SOI, a semiconductor layer 705 having integrated circuit components disposed therein, and an overcoat of insulative material 707 such that the layer 705 is isolated from conductive contacts. Read/write head 709 in the form of a coil (shown in cross section) is connected to the integrated circuit of layer 705 by vias or contacts, and provides magnetic coupling to data media 107 through overcoat 711, which provides electrical isolation as with layer 707. The read/write head has a planarized surface 711 so that an air bearing surface may be formed therein.

A read/write driver 100 has a read/write head 106 made of a semiconductor material 300 for writing and reading data from data media 107 with a preamplifier 303 which is a part of the read/write head 106 to process the write signals. Power wires 305,307 attach to the read/write head 106 for power to the preamplifier 303 which drives a coil 203 connected operatively to at least one output of the preamplifier 303. The coil 203 creates a magnetic field for writing in response to the output and the write signals cause writing to the data media 107. The semiconductor material is selected from the group which includes silicon, compounds of gallium, germanium germanium on silicon and silicon carbide.

The preamplifier 303 further has filtering and similar processing functions for the output to the coil 203. The preamplifier 303 is a part of a read/write head 106 which is formed with semiconductor on insulator (SOI) technology. The preamplifier 303 optionally has differential outputs and drives the coil 203 thereby.

The coil 203 means creates a magnetic field for writing. The preamplifier 303 means further has filter means and other processing function means for the output to the coil 203. The preamplifier 303 means is a part of the read/write head 106 and is formed with semiconductor on insulator (SOI) technology.

A process for making a read/write head 106 from a semiconductor material 300 which is incorporated into a read/write driver 100 for writing and reading data from data media 107 involves preparing a substrate of a semiconductor material. An integrated circuit preamp 303 is formed on the substrate with interconnections, including connection points that connect signal wires 311, 313 and power wires 305, 307 from without the preamp 303. Coil 203 means form a part of the read/write head 106, and are connected operatively to at least an output of the preamplifier 303 means. The substrate is planarized on the side with the preamp 303. The substrate is a semiconductor on insulator (SOI) material. A disc drive 100 using the read/write head 106 to write to the data media 107 has a preamplifier 303 as a part of the read/write head 106 and power wires 305, 307 to the read/write head 106 for power to the preamplifier 303. A process for providing a coil connected operatively to at least one output of the preamplifier 303 allows writing in response to the output. The preamplifier 303 filters and processes functions for the output to the coil 203. The preamplifier 303 may have differential outputs which drive the coil 203.

Other alternatives to the present design disclosed herein may be within the skill of the art and apparent to a person who studies this disclosure. For example, a semiconductor substrate not using SOI but suitably isolated could be used. Further, isolating at another point, such as in the flexure or the actuator, whereby isolation of the head of this invention is not necessary, could be incorporated without departing from the spirit of the invention. Therefore, the scope of the present invention is to be limited only by the following claims.

What is claimed is:

1. A read/write head formed upon a substrate for writing and reading data from data media comprising:
    a preamplifier upon the substrate and formed integrated within the read/write head to process write signals from a read/write driver; and
    a sensor, coupled to the substrate and integrated with the read/write head, connected operatively to an output of the preamplifier for writing data to the data media.

2. The read/write head of claim 1 wherein the substrate is a material selected from a group consisting of: silicon, compounds of gallium, germanium, germanium on silicon, and silicon carbide.

3. The read/write head of claim 1 wherein the preamplifier further is configured to filter the write signals.

4. The read/write head of claim 1 wherein the preamplifier is integrated within the read/write head using semiconductor on insulator (SOI) technology.

5. The read/write head of claim 1 wherein the preamplifier includes differential outputs for driving the sensor.

6. A read/write head for writing and reading data from data media comprising:
    a preamplifier to process write signals from a read/write driver;
    a sensor connected operatively to an output of the preamplifier for writing data to the data media; and
    means for integrating the amplifier and sensor within the read/write head.

7. The read/write head of claim 6 wherein the means for integrating comprises a semiconductor material selected from a group consisting of: silicon, compounds of gallium, germanium, germanium on silicon, and silicon carbide.

8. The read/write head of claim 6 wherein the preamplifier further is configured to filter the write signals.

9. The read/write head of claim 6 wherein the read/write head is formed with semiconductor on insulator (SOI) technology.

10. The read/write head of claim 6 wherein the preamplifier includes differential outputs for driving the sensor.

11. A process for making a read/write head from a semiconductor material for writing and reading data from data media, comprising:
    a) preparing a substrate of a semiconductor material;
    b) creating an integrated circuit preamplifier on the substrate;
    c) forming a sensor upon the substrate being operatively coupled to an output of the integrated circuit preamp; and
    d) planarizing the substrate on a side having the integrated circuit preamp.

12. The process of claim 11 wherein the preparing step comprises utilizing a substrate formed of a semiconductor on insulator (SOI) material.

* * * * *